Oct. 2, 1934.  R. S. FALKINER ET AL  1,975,089
CANE HARVESTING MACHINE
Filed Oct. 6, 1931   7 Sheets-Sheet 1
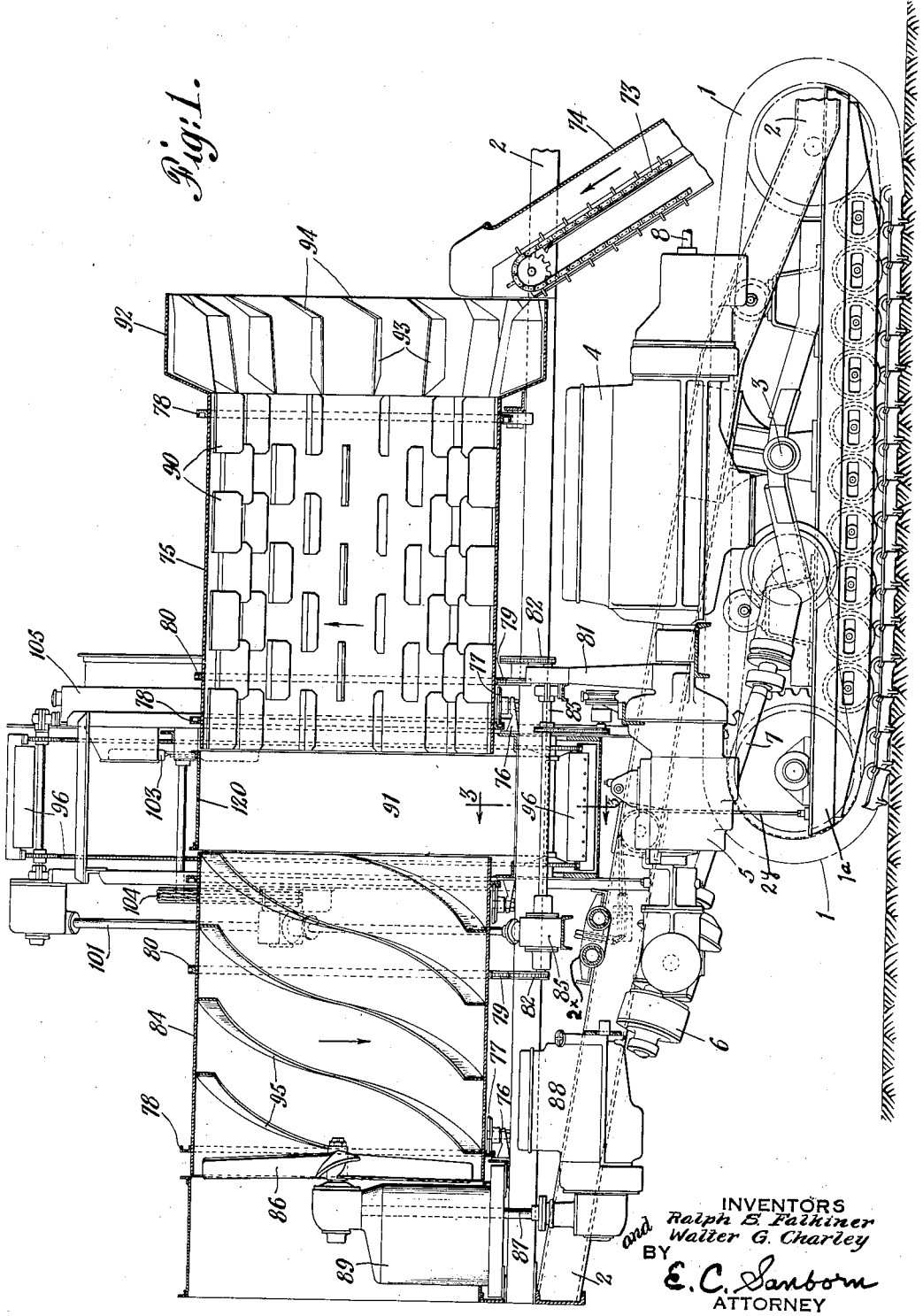
INVENTORS
Ralph S. Falkiner
and Walter G. Charley
BY
E. C. Sanborn
ATTORNEY

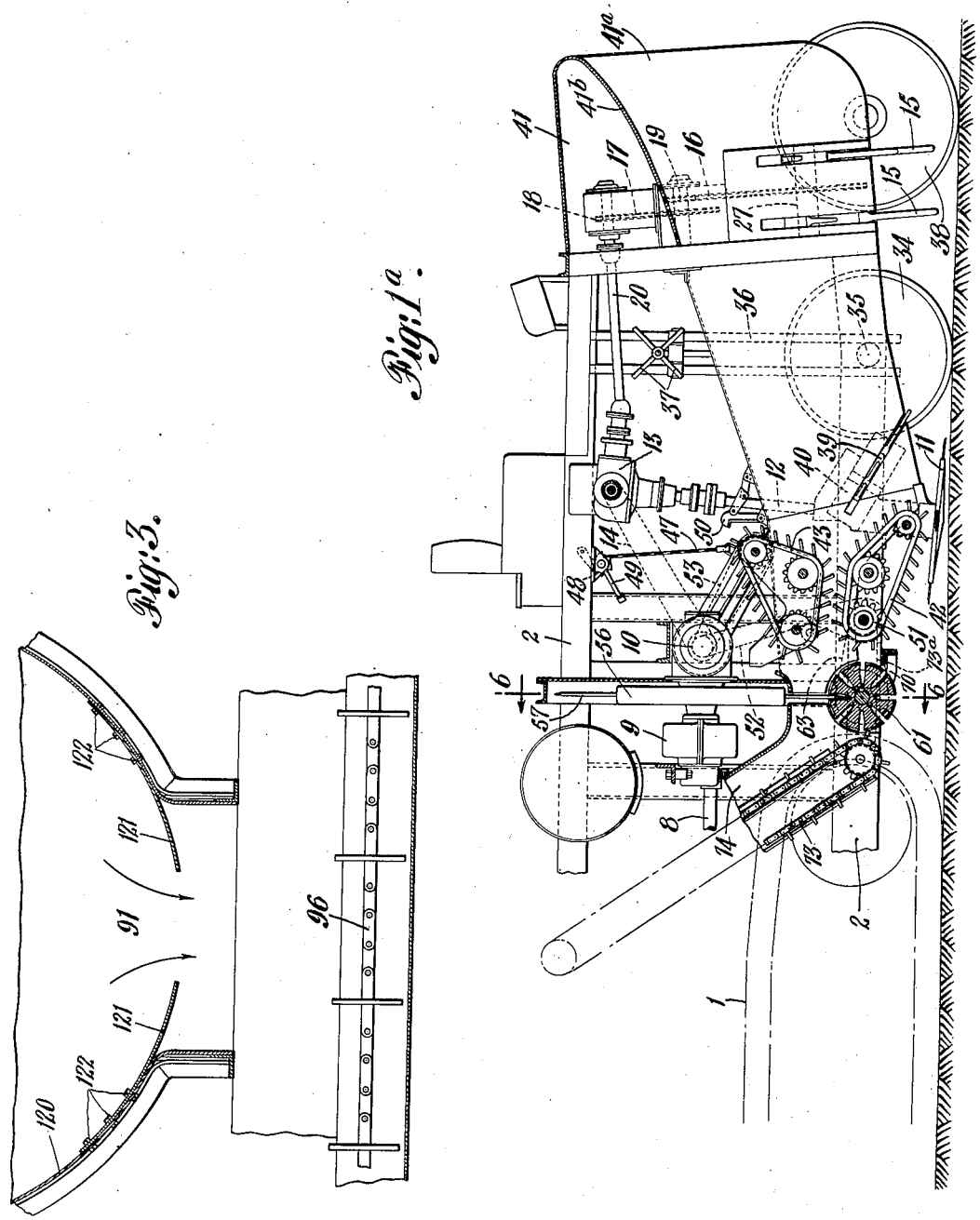

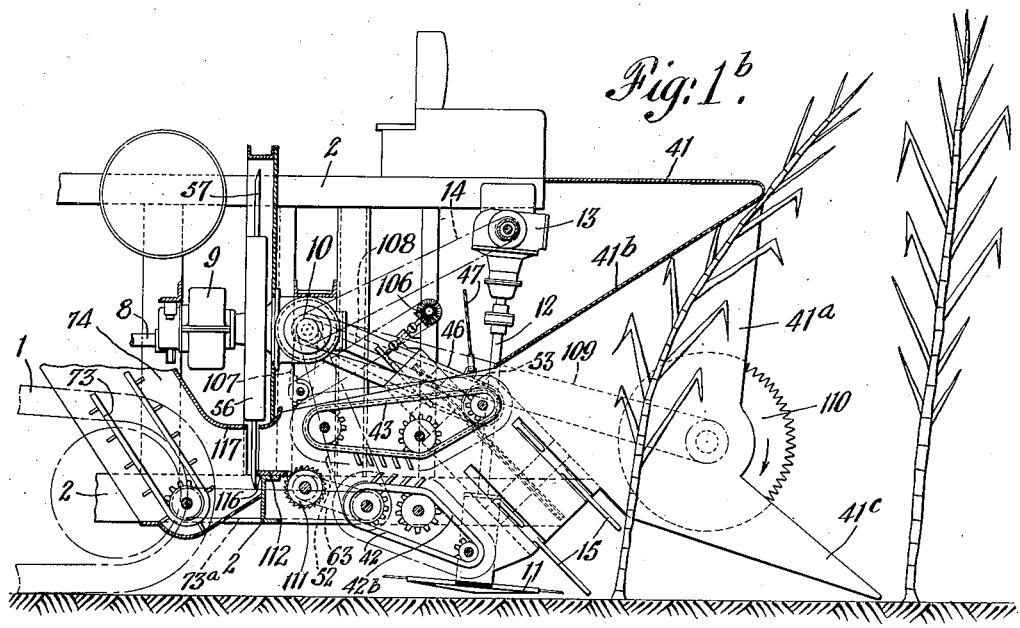

INVENTORS
Ralph S. Falkiner and
Walter G. Charley
BY
E. C. Sanborn
ATTORNEY

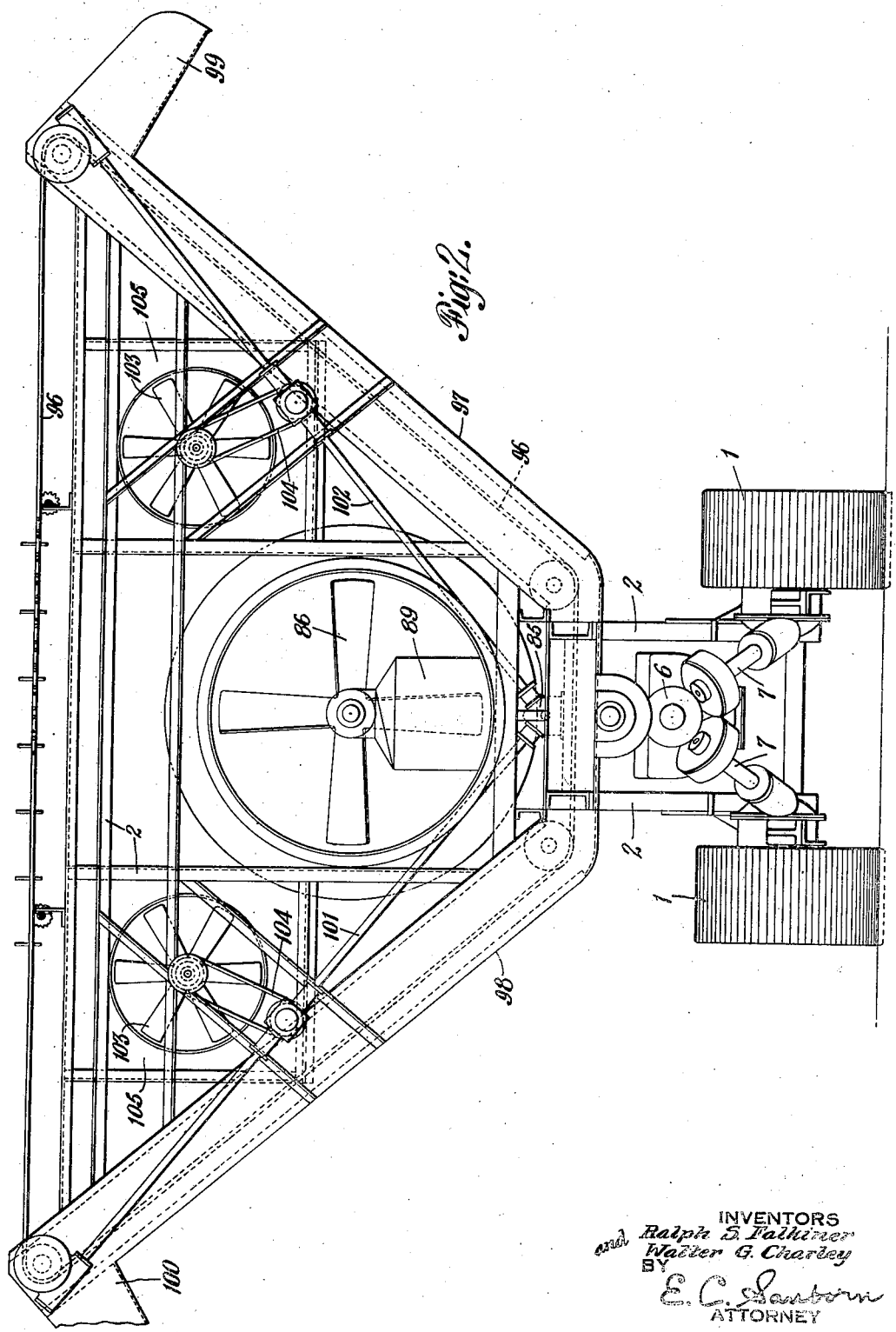

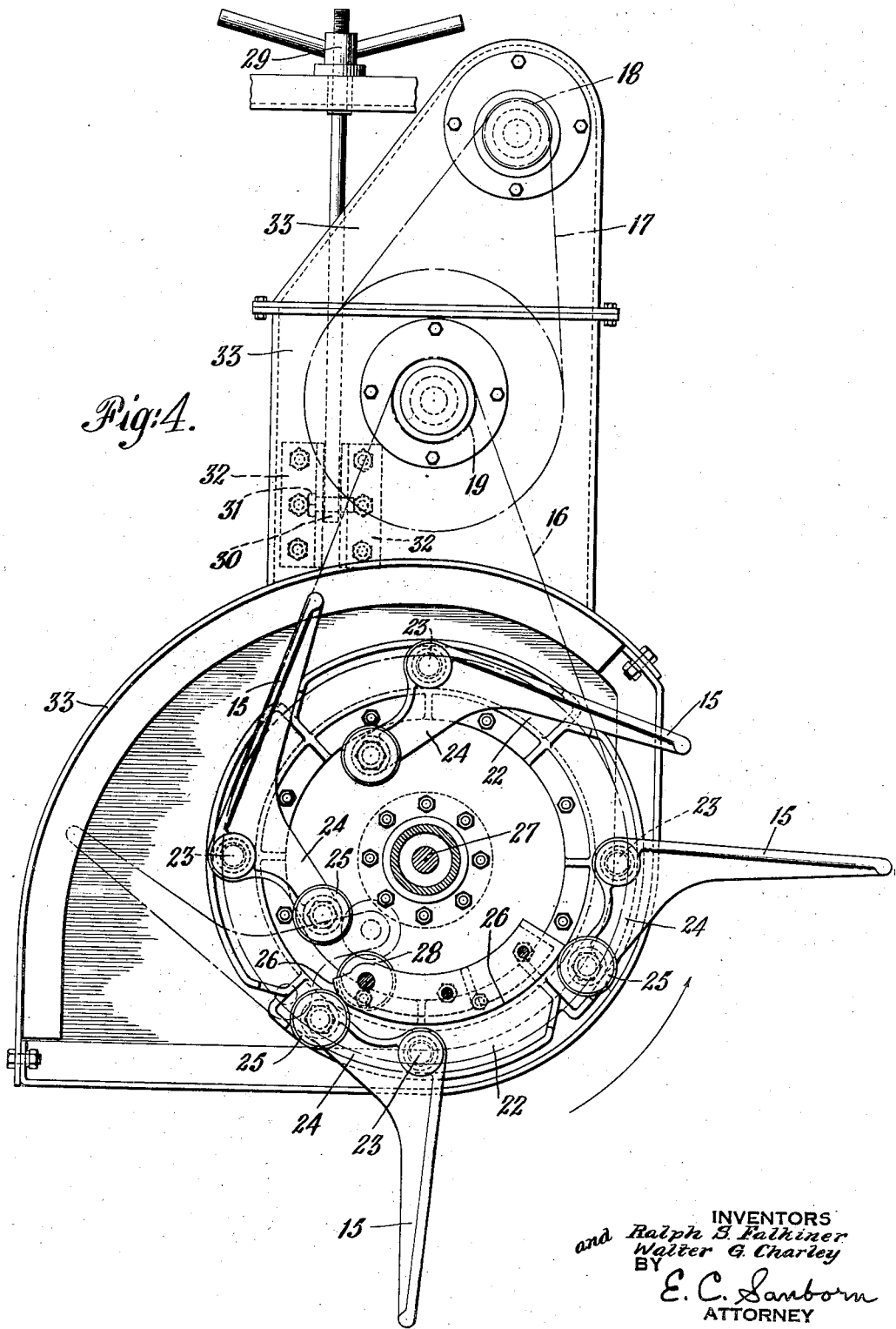

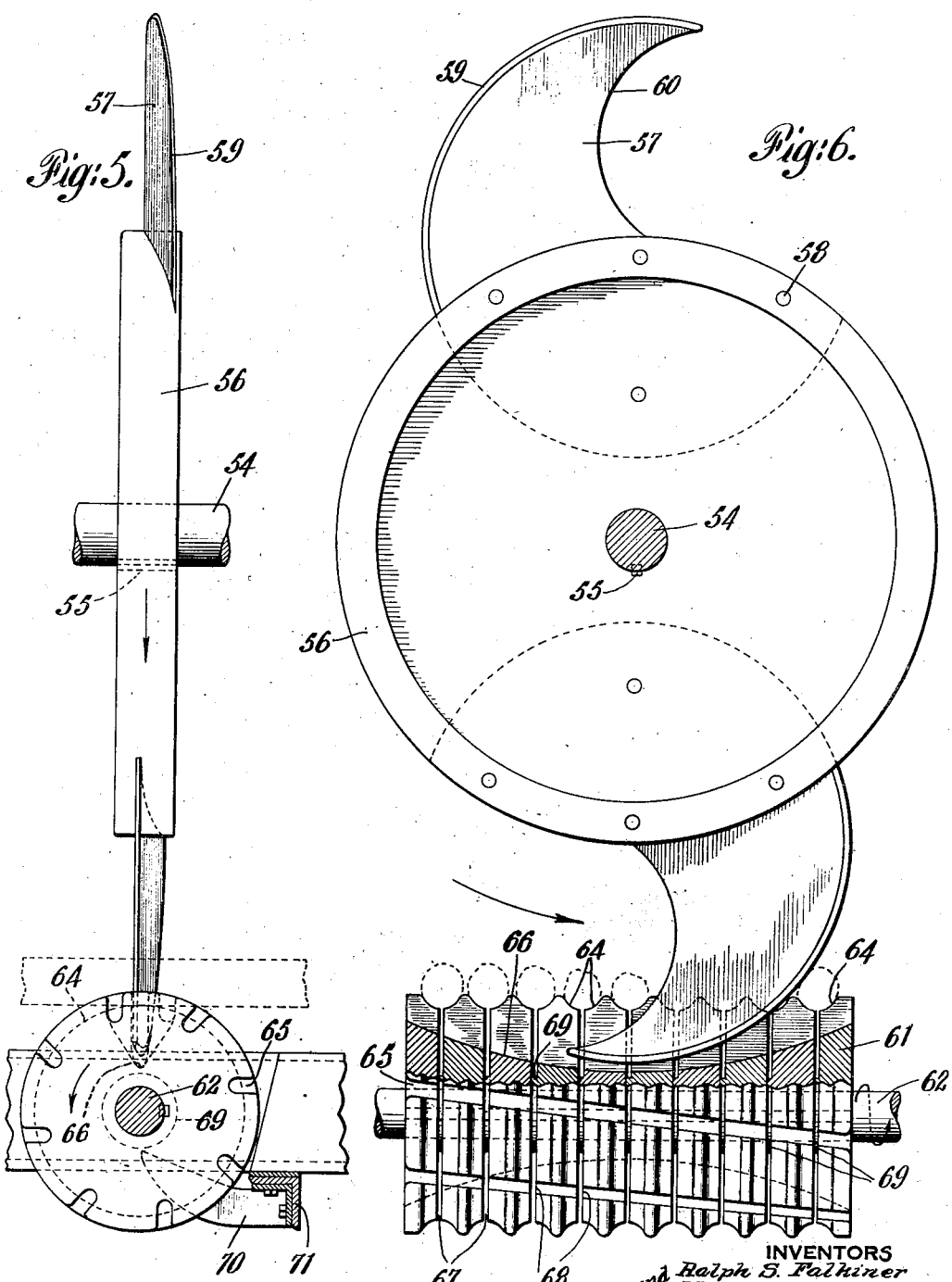

Patented Oct. 2, 1934

1,975,089

UNITED STATES PATENT OFFICE 1,975,089

CANE HARVESTING MACHINE

Ralph Sadleir Falkiner and Walter George Charley, Melbourne, Victoria, Australia, assignors to Falkiner Cane Harvester Corporation, New York County, N. Y., a corporation of New York Application October 6, 1931, Serial No. 567,156

11 Claims. (Cl. 56—17)

This invention relates to machines for harvesting sugar cane, and more particularly to improvements in machines which gather the cane, convey it to chopping mechanism, separate the trash from the cane, and discharge the cane at suitable points. We have disclosed one form of such a machine in our copending application Serial No. 443,999½, filed April 14, 1930. One feature of the present invention resides in the provision in such a machine of improved means for gathering the cane, or more specifically, means which pick up the cane, after it is severed by suitable knives, and feed it into the machine. Another feature is the provision of improved chopping mechanism for cutting the cane to suitable lengths. Still another feature embraces improvements in the parts of the machine which separate the trash from the cane. One of the principal objects of the invention hence resides in the provision of such mechanism which is simple and inexpensive to manufacture, efficient in operation and durable in service.

Other objects and advantages of our invention will be better apparent from the following detailed description of several embodiments thereof, reference being had to the accompanying drawings wherein:

Fig. 1 is a side elevation, partly in section of the rear portion of a machine embodying our invention.

Figs. 1a and 1b are side elevations of two forms of the forward portion of such a machine, that in Fig. 1b being preferred.

Fig. 1c is a front elevation of the construction shown in Fig. 1b.

Fig. 2 is a rear elevation of the machine shown in Fig. 1.

Fig. 3 is a vertical section taken on the line 3—3 of Fig. 1 looking in the direction of the arrows.

Fig. 4 is a front elevation of mechanism for picking up the cane.

Figs. 5 and 6 are side and front elevations, respectively, of the chopping mechanism shown in Fig. 1a.

Figure 1D:
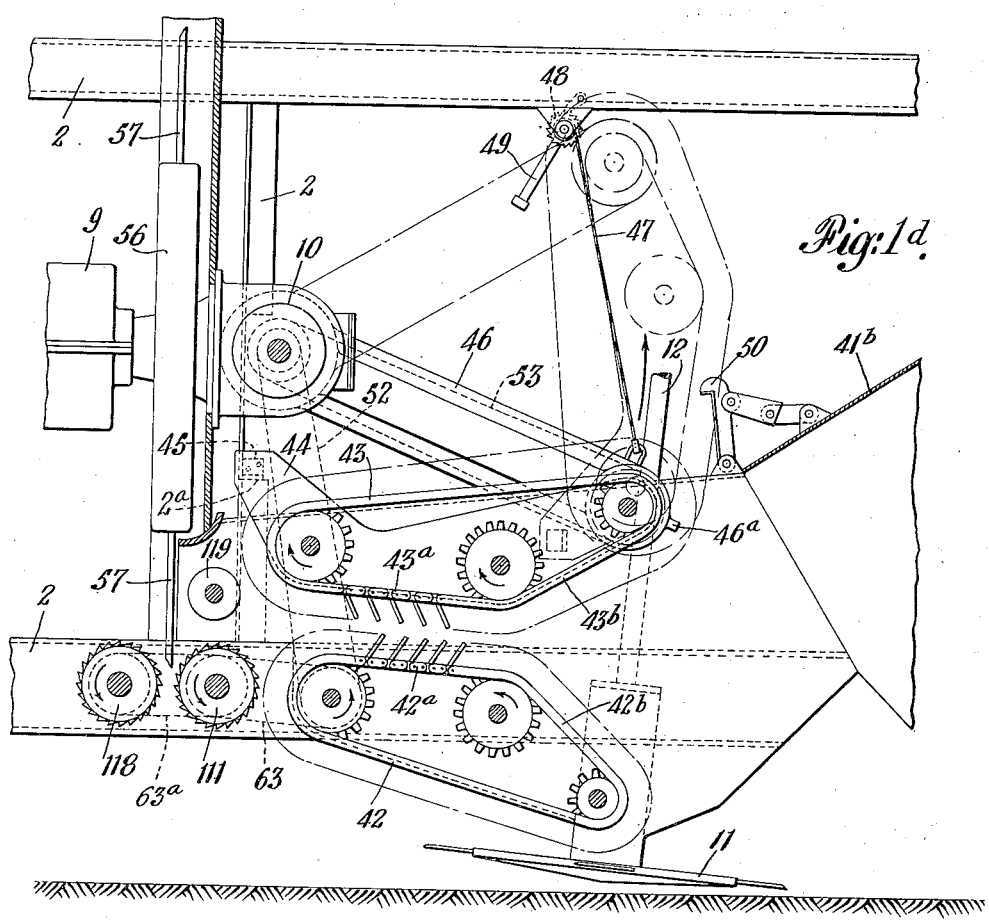
Fig. 1d is a side elevation, on an enlarged scale, of the conveying mechanism shown in Fig. 1b, and of a modified chopping mechanism.

Referring particularly to Fig. 1, there is shown at 1 a caterpillar tractor, of conventional design, on which is pivoted at 3 a frame 2. On the frame there is mounted an engine 4 for driving both the caterpillar treads through gearing 5, universal joint 6, and shafting 7, in known manner. The frame 2 and the mechanism supported thereon is preferably arranged so that its center of gravity is forward of the pivot, so that the forward end of the frame normally tends to swing down. For raising the forward end when the machine is to be moved from one field of cane to another a pneumatic hoist 2x may be provided secured to the frame 2 and connected to tractor frame 1a by cable 2y. The engine 4 preferably also serves to drive the various devices on the forward end of the frame, shown in Figs. 1a and 1b, through shaft 8, gearing 9 and reversing gearing 10, the latter gearing enabling rotating cutting knives 11, which sever the cane adjacent the ground, and the pick-up fingers (hereinafter described), at opposite sides of the machine, to be driven in opposite directions. These knives may be conveniently mounted on shafting 12 driven from appropriate sides of gearing 10 by chains 14 and gearing 13. It will be appreciated that the knives and pick-up fingers at opposite sides of the machine are to be rotated in opposite directions, and hence that their drives are connected to appropriate sides of reversing gearing 10.

Proceeding to a description of these fingers and cooperating mechanism, which constitute one of the features of the present invention, reference is had to Fig. 4. At either side of the machine for operating on cane therebetween, each pickup finger 15 is pivoted at 23 to a rotary member 22, and has an extension 24 forming an angle to the finger proper or cane engaging portion and having a roller 25 carried at its end for engaging stationary cam surface 26. The rotary member is suitably mounted on shaft 27. A roller 28 is carried at one end of the cam surface for contacting with roller 25 on finger extension 24 to throw or extend each finger into cane-engaging position. The height of the fingers from the ground may be adjustable for which purpose there is shown a turnbuckle 29 engaging a threaded rod 30, the lower part of which is secured by bolt 31 to brackets 32 on sub-frames 33 carried by frame 2 and supporting the pickup finger mechanism.

In operation, when the rotary member is revolved in the direction of the arrow, the rollers on the finger extensions successively strike the roller 28 and the fingers, as they come adjacent the cane, are thrown into the position in which they extend generally radially, and in which they travel inwardly and upwardly to lift the cane until released when their rollers pass the end of the cam, after which, upon further rotation of the member 22, they return to retracted position by gravity, aided by the weight of the cane, to the positions in which they lie along chords of the rotary member. The parts may be adjusted and be of such dimensions that the cane is raised the desired extent, whereupon the fingers are free to recede so that they will not interfere with other parts of the machine or with the movement of the cane which has at this period come into position for engagement by the other parts of the machine, hereafter described. The rotary members preferably reside in a plane or planes generally transverse to the direction of motion of the machine, and by this we mean a plane or planes in which the fingers travel from one side of the machine toward the other. The inclination of such plane or planes to the vertical may vary considerably, and be, for example, as shown in Fig. 1a or Fig. 1b. The construction illustrated in Fig. 4 is, of course, that at the left hand side of the machine (as viewed from the front), while the construction at the other side will be symmetric for opposite rotation.

For supporting the forward portion of the frame upon the ground when the machine is operating, wheels 34 (at either side of the machine) are provided, having axles 35 which may be either fixed to the frame or mounted in adjustable uprights 36 on the frame. Suitable means for raising or lowering each axle may be employed, and, as indicated, diagrammatically at 37, may consist of a suitable turnbuckle arrangement for simultaneously raising or lowering the wheels. A rotary disc coulter 38 is provided at either side at the forward end of the machine for cutting through tangled cane.

Above the knife 11, and inclined upwardly and rearwardly, are gathering chains 39 such as are described in our copending application Ser. No. 386,125, filed Aug. 15, 1929, driven by any convenient means 40 from shaft 12. Extending generally around the front and along the sides of the cutting and pick-up mechanism is a fender or hood 41. The hood consists generally of side portions 41a and a cross-portion 41b joining these near their tops and adapted to strike the cane to bend it over. Horns 41c extend forwardly from the side portions and are desirably vertically adjustable in any suitable manner (not shown). It will be understood that the two sides of the machine are similar with respect to these features, and that the fenders at either side form a throat into which the cane is guided to the conveyors, which will now be described.

At 42 there is a toothed conveyor of the continuous belt type and of generally triangular shape, secured to frame 2, and at 43 is a similar conveyor. Conveyor 43 may be mounted for vertical displacement, as best shown in Fig. 1d. The conveyors have working faces 42a and 43a which are generally and normally parallel, and working faces 42b and 43b, which latter (Fig. 1d), preferably extend forwardly and make similar angles with working faces 42a and 43a, respectively, forming a jaw into which the cane is caused to enter. Conveyor 43 is shown mounted on a sub-frame, only one side plate 44 of which is shown. The forward end of this frame is pivoted to radius rod 46 and the rear end is normally freely supported by a stop 45 which rests on a flat abutment or seat 2a formed on the frame 2, which is suitably constructed so that the conveyor is permitted to be displaced vertically by the cane. The forward end of the sub-frame may be supported on any suitable bracket (not shown), while for raising the sub-frame, the forward end of radius rod 46 is connected through cable 47, to ratchet device 48 having an operating handle 49. To prevent excessive upward movement of the conveyor during operation, the stop 45 is adapted to abut against the housing which contains gearing 10, while a retractible catch 50 is provided for engaging lug 46a on the radius rod. In this construction the cane may raise either end of the conveyor 43, so that varying amounts of cane are accommodated, while the weight of the conveyor presses down on the cane, the frame abutments determining the lowermost position of the conveyor.

This mounting of the conveyor is highly advantageous not only because, as stated, it permits the machine to accommodate varying amounts of cane, but also because it tends to prevent balling up of the cane and aids in maintaining an even feed to the chopping mechanism. Should it be necessary, as it sometimes is, with badly growing cane, to remove a tangled mass from between the conveyors, the catch 50 is retracted and the ratchet is operated to lift the forward end of the conveyor whereupon, because of the action of the radius rod, stop 45 moves forward off its seat and the rear end of the conveyor is free to swing forward until displaced from operative position, stop 45 being moved off seat 2a, and the whole conveyor being suspended by the cable, when both conveyors are accessible for cleaning. The conveyors 42 and 43 are driven in opposite directions by chains 52 and 53, respectively, connected to appropriate sides of reversing gearing 10.

The conveyors, as already indicated, feed the cane to a chopping mechanism, one form of which is shown in Figs. 5 and 6 as including shaft 54, key 55 and hub 56 comprising sections which have knives 57 secured between them by bolts 58. These knives have cutting edges 59 and are preferably formed so that they flare from cutting edge to trailing edge 60, in the direction of travel of the cane, or are mounted so that they form an angle greater than 90 degrees with respect to said direction.

The trailing edge is also sharpened for clearing out cane when the knives are operated in reverse. The cutting edge 59 being nearer the approaching cane than the trailing edge, the result is that the movement of the cane, which is continuously fed to the knives, is not interfered with by the knives. To further promote this result the knives are advantageously cut away at their trailing edges as shown at 60, to reduce the width of the blade between the leading and trailing edge where it traverses the cane. Shaft 54 and knives 57 are shown interposed between gearing 9 and reversing gearing 10 and may conveniently be driven by said gearing 9. For cooperation with the chopping or cutting knives we have provided a rotary chopping block 61 which is keyed on shaft 62 and driven by chain 63 from sprocket 51. This block is preferably cylindrical and provided with circumferential grooves 64 in which the cane rests. Angularly extending passages 65 are formed in the sides of the block with curved bottoms 66, so that the ends of the knives may travel therethrough while the block is rotating. For permitting these passages to be cleaned of material which tends to lodge in them during the chopping operation the block has slots 67 formed in it, these slots extending around the block in planes perpendicular to its axis and are of sufficient depth so that they intersect the passages 65 at 68, but stop short of the shaft, leaving a central collar 69 so that the block is all in one piece, though obviously the block could be formed in sections with individual spacing collars between the sections. A comb construction has teeth 70 secured as at 71 to the frame, and each tooth extends into its respective slot to a distance sufficient to permit it to enter the areas 68 formed by the intersections of the slot and the passages. After the material leaves the chopper it is carried by conveyor 73, in housing 74, to the mechanism for separating the trash from the useful portions of the cane. Conveyor 73 is conveniently driven from the shaft of sprocket 51 by any suitable means such as chain 73a.

Included in what may be described as the trash separating mechanism there is a drum 75, mounted for rotation about a horizontal axis by means of brackets 76 which carry rotatable plates 77 for engagement with circular channel members 78 on the drum. The drum may be rotated by chain 79 for engaging teeth 80 on the drum, said chain being driven from the engine 4 by a chain in housing 81 and a gear 82 on shaft 83. Drum 84 is similarly mounted, to the rear of and spaced from drum 75, and is driven by similar mechanism, but preferably in the reverse direction (as indicated by the arrows, Fig. 1) from gearing 85. These drums are open at both ends and for drawing a current of air through the drums, a fan 86 is mounted in the rear end of drum 84, and driven through shaft 87 from motor 88, which is run at constant speed to keep the force of the draft uniform, and the efficiency of the fan and motor at a maximum. A stream-lined housing 89 may be placed around shaft 87.

The drum 75 is provided on its interior with a series of slats or cleats 90 for lifting material in the drum and dropping it through the air stream induced by fan 86. The trash (leaves, tops and so forth) being lighter than the cane, a considerable portion of it is removed almost as soon as the material enters the drum, being directly blown out through the rear open end of drum 84. Repeated lifting and dropping of the heavier material through the air stream, effects further removal of trash. The combined effects of the air stream and the force feed of new material is to move the heavier material rearward till it reaches discharge space 91 between the drums.

In construction of this character it is advisable to drop the material through the air stream from a point adjacent the top of the drum as often as possible. If the conveyor which carries the material to the drum is extended to feed the material into the front of the drum at the top, it interferes with the air stream and the advantages of the construction are diminished. In order to feed the material into the drum proper at the top and forward end thereof, without sacrificing other advantages, we have provided at the forward end of the drum 75 an auxiliary drum 92 which is preferably of larger diameter than drum 75 and is carried for rotation therewith. In this drum 92, there are cleats 93 for lifting the material which is fed in at the bottom, and these are inclined slightly upwardly with respect to the direction of rotation of their drum, and also toward the forward end thereof. Meeting the forward ends of the respective cleats are upturned baffle portions 94 which aid in maintaining the material on the cleats without appreciably interfering with the air stream since they are adjacent the perimeter of the auxiliary drum and leave substantially the entire cross section of the main drum open. In other words, the cleats preferably lie outwardly of the perimeter of drum 75.

Drum 84 is provided with helical vanes or fins 95 which are arranged to feed back to opening 91 any good cane which may have been carried past said opening into said drum. As has been mentioned, the drum 84 is rotated in the opposite direction from drum 75, because material in drum 75 is passed mainly through the air in the side of the drum at which it is carried upward, and the trash is mainly in this portion of the air stream, so that relatively clean air is on the opposite side of the drum, the material in drum 84 being thus subjected to the relatively clean air for removing any trash still contained in the material.

For carrying off the cane which enters the opening 91 and falls downward, there is provided a conveyor 96 which raises the material through housing 97 or 98, depending on the direction of rotation, which may be reversed to chutes 99 or 100, for delivering material to transporting wagons. Shafting 101 and 102 drives the conveyor from gearing 85. All this conveyor construction is in itself conventional and is illustrated in our copending case first referred to. At each side of the machine a fan 103 may be provided driven by belts 104 from said shafting, for drawing air through motor radiator 105.

Surrounding the space 91 between the drums, but open at the bottom, is a housing 120 which is closely adjacent the perimeters of the drums, to form therewith a continuous path for the air, and to prevent escape of material except to the conveyor 96. Extending into the opening are adjustable plates 121, secured to the housing by suitable means such as bolts 122 cooperating with bolt holes in the plates. Adjustment of these plates serves to vary the effective opening through which material passes to the conveyor 96.

In the modification shown in Fig. 1b, which is preferred over that in Fig. 1a, instead of the gathering chains 39, there are provided on each side of the machine two sets of gathering fingers 15 which are located just forward of the knives 11 and generally parallel to portion 42b of the lower conveyor. The fingers on each side of the machine may be operated by associated bevel gearing 106 driven from the appropriate side of gearing 10, through chains 107 and 108.

This construction has the advantage, among others, of being embodiable in a comparatively short machine. Also in Fig. 1b, in place of disc coulters 38, for cutting through tangled cane, there are provided power driven saw toothed cutters 110 positioned above the ground and both rotated in the direction of the arrow by chains 109 from the proper side of gearing 10. For simplicity, the chopping block described may be replaced by a chain driven toothed roller 111, and a plate 112 on frame 2 for suporting the cane adjacent the chopping knife. In this construction, as shown in detail in Figs. 7 and 8, the roller 111 has spaced rows of radial teeth 113, while plate 112 has comb teeth 114 which extend between the rows of teeth on the roller for cleaning it. The forward edge of the plate is closely adjacent the roller and its rearward edge 116 is close to the rotating knife and may be advantageously beveled. Housing 117, through which the chopping blades project, serves to aid in preventing the cane from rising to too great a depth on plate 112.

Figure 7:
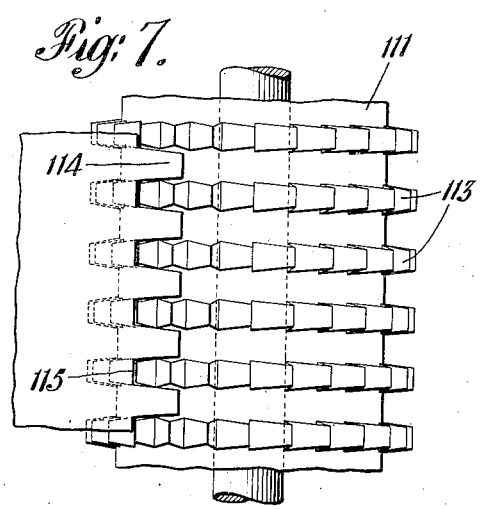
Figs. 7 and 8 are plan and end elevation views, respectively, partly broken away, of the chopping mechanism of Fig. 1b.
Figure 8:
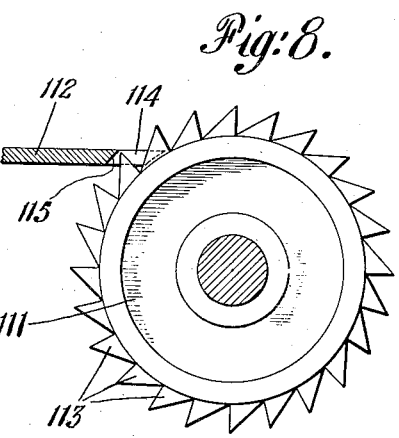

Still another modification of the chopping mechanism is illustrated in Fig. 1d, where the knife simply rotates between two rollers 111 and 118, driven by chains 63 and 63a, and preferably though not necessarily constructed as shown in Figs. 7 and 8. Here, as well as in the construction shown in Fig. 1b, it is desirable to locate a free roller 119 generally above roller 111. This roller may be advantageously mounted between side plates of conveyor 43 in any suitable manner not shown. The term trash used herein, and in the following claims, intends any material such as leaves, tops or undesirable matter lighter than the useful cane.

Matter disclosed but not claimed herein is claimed in our application Serial No. 443,999½ hereinbefore referred to.

The terms and expressions which are employed are used as terms of description and not of limitation, and there is no intention, in the use of such terms and expressions of excluding any equivalents of the structure shown and described or portions thereof, it being recognized that various changes may be made without departing from the spirit of invention.

We claim:

1. In a cane harvesting machine, cooperating conveyors adapted to advance cane therebetween, and means to mount one of the conveyors above the other for vertical displacement by the cane.

2. In a cane harvesting machine, cooperating conveyors adapted to advance cane therebetween, means to mount one of the conveyors in fixed relation to the machine, and means to mount the second conveyor above the first conveyor for vertical displacement by the cane comprising a radius rod connected to the second conveyor, adjustable means for determining the lowermost position of the forward end of said second conveyor and means for determining the vertical travel of the rearward end.

3. In a cane harvesting machine, cooperating conveyors adapted to advance cane therebetween, means to mount one of the conveyors in fixed relation to the machine, and means to mount the second conveyor above the first conveyor for vertical displacement by the cane, said last-named means comprising a seat for supporting the rearward end of the second conveyor, means for suspending the forward end, and retractable means for normally preventing said forward end from rising beyond a predetermined point.

4. In a cane harvesting machine having a frame, a conveyor mounted thereon, a second conveyor generally above the first conveyor, means to support the forward end of the second conveyor from the frame and to permit it to move a predetermined distance upward, means to support the rearward end from the frame for similar movement, and means to limit horizontal movement of the said second conveyor.

5. In a cane harvesting machine having a frame, a conveyor mounted thereon, a second conveyor supported at its rear end on the frame, and means to support the forward end of said second conveyor for predetermined vertical movement by cane between the conveyors.

6. In a cane harvesting machine having a frame, a conveyor mounted thereon, a second conveyor generally above the first conveyor, means on the frame for supporting the rearward end of the second conveyor, a cable for raising the forward end of said second conveyor from the frame, and means to vary the length of the cable.

7. In a cane harvesting machine having a frame, a conveyor mounted thereon, a second conveyor generally above the first conveyor, means on the frame for supporting the rearward end of the second conveyor, a cable for raising the forward end of said second conveyor from the frame, retractible means for normally limiting upward movement of said forward end, and means to vary the length of the cable.

8. In a cane harvesting machine having a frame, a conveyor mounted thereon, a second conveyor generally above the first conveyor, means on the frame for freely supporting one end of the second conveyor, means for supporting the other end of said second conveyor and for swinging it upwardly and away from the first end to displace it from operating position.

9. In a cane harvesting machine having a frame, a conveyor mounted thereon, a second conveyor spaced vertically from the first conveyor, means to support the forward end of said second conveyor and to permit it to move a predetermined distance upward, means to support the rearward end of said second conveyor for similar movement, and means for swinging one end of said second conveyor upwardly and away from the other end to displace it from operating position.

10. In a cane harvesting machine having a frame, a conveyor mounted thereon, a second conveyor spaced vertically from the first conveyor, means to support the forward end of said second conveyor and to permit it to move a predetermined distance upward, means to support the rearward end of said second conveyor for similar movement, and means for swinging one end of said second conveyor upwardly and away from the other end to displace it from operating position, the last mentioned means comprising a cable connected to one end of said second conveyor, and means for operating said cable.

11. In a cane harvesting machine, cooperating conveyors adapted to advance cane therebetween, means for mounting one of said conveyors above the other for vertical displacement by the cane, said last named means comprising a seat for supporting the rearward end of the upper conveyor, means for suspending the forward end and enabling said forward end to move vertically, retractable means for normally preventing said forward end from rising beyond a predetermined point, and means for swinging one of said ends of said upper conveyor upwardly and away from the other end to displace said upper conveyor from operating position.

RALPH SADLEIR FALKINER.
WALTER GEORGE CHARLEY.